United States Patent [19]

Kaji

[11] Patent Number: 4,532,099

[45] Date of Patent: Jul. 30, 1985

[54] CONDUCTIVE STRUCTURE AND METHOD OF MANUFACTURE THEREOF

[76] Inventor: Isamu Kaji, 48-38, Higashino-Yashiro, Yamashina, Higashiyama-ku, Kyot, Japan

[21] Appl. No.: 474,191

[22] Filed: Mar. 10, 1983

[30] Foreign Application Priority Data

Mar. 10, 1982 [JP] Japan .................................. 57-37795
Mar. 26, 1982 [JP] Japan .................................. 57-49813
Jul. 14, 1982 [JP] Japan .................................. 57-122388

[51] Int. Cl.$^3$ .......................... B29D 9/00; B29D 9/04; B32B 27/20
[52] U.S. Cl. .................................... 264/510; 156/176; 156/228; 156/244.11; 156/246; 156/285; 156/308.2; 156/309.6; 156/324.4; 264/516; 264/104; 264/257; 428/229; 428/245; 428/253; 428/263; 428/288; 428/296; 206/328; 206/524.6
[58] Field of Search ............... 264/510, 516, 104, 257; 156/176, 228, 244.11, 246, 285, 308.2, 309.6, 324.4; 428/229, 245, 253, 263, 288, 296

[56] References Cited

U.S. PATENT DOCUMENTS

| 3,958,066 | 5/1976 | Imamura et al. ..................... 428/372 |
| 4,194,037 | 3/1980 | Stoller .................................... 428/92 |
| 4,258,094 | 3/1981 | Benedyk ............................... 428/85 |
| 4,309,479 | 1/1982 | Naruse et al. ........................ 428/367 |
| 4,336,028 | 6/1982 | Tomibe et al. ...................... 427/126.1 |

FOREIGN PATENT DOCUMENTS 1228573 4/1971 United Kingdom .

Primary Examiner—James C. Cannon
Attorney, Agent, or Firm—Armstrong, Nikaido, Marmelstein & Kubovcik

[57] ABSTRACT

A conductive structure in which conductive fibers $a_1$ are sticked to the substrate B by melting thermally fusible fibers $a_2$ entangling with said conductive fibers $a_1$. This structure is manufactured by sticking conductive fibers $a_1$ to the surface of the substrate B to which the cloth-like material A containing conductive fibers $a_1$ and thermally fusible fibers $a_2$ is sticked under pressure at a temperature not lower than a melting point of said thermally fusible fibers $a_2$.

5 Claims, 2 Drawing Figures

CONDUCTIVE STRUCTURE AND METHOD OF MANUFACTURE THEREOF

BACKGROUND OF THE INVENTION

This invention relates to a conductive structure in the form of a sheet, film, tray, board, cabinet, etc., and particularly to a conductive structure maintaining strength, transparency, and color of the substrate thereof, as well as a method of manufacturing such structure.

As a conductive sheet used for packing the IC, a molded plastic sheet made of a thermoplastic resin as polyvinyl chloride blended with carbon black has been known. However, this sheet is attended by various problems that: conductivity as high as expected can not be obtained unless particles of carbon black are thickly dispersed without interruption throughout the sheet; mechanical properties intrinsic to the plastic material thereof are impaired by blending of a large quantity of carbon black; thickness of the sheet or film is limited by pin holes which may possibly be generated when the sheet or film is intended to be thinner in the course of manufacture, and thickening of the sheet leads to high cost which invites economic disadvantage; the sheet cannot be colored in other hues than black; handling of carbon black is unpreferable in view of environmental operation conditions; and conductivity of the sheet produced is considerably reduced when subjected to the secondary process as vacuum molding.

Another kind of conductive sheet made in resin blended with surfactant and dependent on melt-molding has been known, which is advantageous because of capability of maintaining transparency and color, however, followed by many disadvantages such as gradual transfer of surfactant to the sheet surface resulting in a decline of conductivity within a lapse of about a half or a full year after produced, possibility of contaminating the contents covered or wrapped by the sheet due to cozing of surfactant transferred to the surface side of the sheet, rapid lowering of static-eliminating capacity under low humidity, and insufficient conductivity.

An object of this invention is to provide a novel and improved structure excellent in conductivity and a method of manufacture thereof.

Another object of this invention is to provide a structure endowed with conductivity without impairment of mechanical properties, transparency, and color of the substrate, as well as a method of manufacture thereof.

These and other objects of the invention will become apparent in the detailed description and examples which follow.

SUMMARY OF THE INVENTION

It has now been found that the above-mentioned defects of conventional conductive sheet can be completely eliminated and the objects of the present invention can be attained by providing a new conductive structure comprising that conductive fibers $a_1$ are sticked to the substrate B by melting of the thermally fusible fibers $a_2$ entangling with said conductive fibers $a_1$. Such a conductive structure as above is manufactured by pressure-sticking a cloth-like material A containing conductive fibers $a_1$ and thermally fusible fibers $a_2$ to the surface of the substrate B at a temperature not lower than the melting point of said thermally fusible fiber $a_2$.

DESCRIPTION OF THE INVENTION

Figure 1:
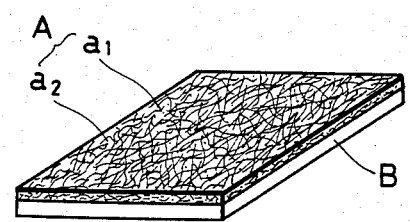
FIG. 1 is a perspective view showing the state of the cloth-like material A and substrate B before subjected to thermal pressing for sticking; and, FIG. 2 is a perspective view thereof after subjected to thermal pressing for sticking.

In the present invention, a cloth-like material A containing conductive fibers $a_1$ and thermally fusible ones $a_2$ is used as a textile material.

As the conductive fiber $a_1$, copper-adsorption fiber, plated fiber, carbon fiber, metalized fiber, or fine metallic wire is used. The conductive fiber $a_1$ plays a role of imparting conductivity to the substrate B that will be described later. Among such fibers as described above, the copper-adsorption fiber is particularly preferable because of an appropriate specific resistivity ranging from $10^{-2}$ to $10^{\circ}$ $\Omega$cm, lightweight and softness, adaptability to any color, and anti-bacterial property thereof. A copper-adsorption fiber means a fiber having a cyano radical, such as acrylic fiber or cyano-group-introduced nylon fiber, and reduced after subjected to adsorption of copper ion thereto, for example, fiber manufactured according to the method disclosed in U.S. Pat. No. 4,336,028.

As the thermally fusible fiber $a_2$, polyolefin, nylon, polyester, acrylic, or other various fibers can be used. The thermally fusible fiber $a_2$ melts when heat-pressed and plays a role as a binder for firmly sticking the conductive fibers $a_1$ to the substrate B that will be described later.

Another kind of fiber $a_3$ having a melting point as high as not showing fusibility when heat-pressed or that absolutely not showing fusibility, besides said conductive fibers $a_1$ and thermally fusible ones $a_2$, may be contained in the cloth-like material when required. The fiber $a_3$ of this kind serves as a reinforcing material for making easy the manufacture of a cloth-like material.

A cloth-like material A is made of the abovesaid fibers and in the form of non-woven, woven, or knitted fabric.

A rate of quantity of conductive fibers $a_1$ contained in the cloth-like material A is required to be at least 0.01%, more preferably 0.1%, by weight. The upper limit is 99% and more preferably 95%. The most preferable rate is within a range from 0.1 to 50% by weight. An extremely small quantity of conductive fibers $a_1$ makes it impossible to obtain conductivity as high as expected whereas a too large quantity prevents sticking of fibers to the substrate B.

A quantity rate of thermally fusible fibers $a_2$ in the cloth-like material A is required to be at least 1% and preferably at least 5% by weight. The upper limit is up to 99.99% and preferably to 99.9%. The most preferable rate is within a range from 99.9 to 20% by weight. An extremely small quantity of fusible fibers $a_2$ causes incomplete sticking of conductive fibers $a_1$ to the substrate B whereas too large quantity of fusible fibers $a_2$, which means a relatively small quantity of conductive ones $a_1$, makes it impossible to obtain conductivity as high as expected.

A mixing rate of other kind of fibers $a_3$, if used, than the abovesaid two is indicated by the remainder left when subtracting a percentage of the total quantity of the conductive and the fusible fibers from 100.

As the substrate B, a resin molded material such as sheet, film, or board; woven fabric, non-woven fabric, knitted fabric, leather, rubber, paper, board of inorganic material, or other various materials are used; and, in particular, the resin molded material is important. As resins to be used, available are thermoplastic resins such as polystyrene, ABS resin, polyethylene, polypropylene, ethylene-vinyl acetate copolymer, polyvinyl chloride, acrylic resin, nylon, polyester, polycarbonate, polyacetal, polyimide, etylene-vinyl alcohol copolymer, cellulose resin, or thermoplastic polyurethane; and, further, thermosetting resins such as phenol resin, urea resin, melamine resin, guanamine resin, epoxy resin, diallyl phthalate resin, or unsaturated polyester resin can be used.

According to the present invention, said cloth-like material A and substrate B are subjected to pressure-sticking at a temperature not lower than the melting point of said thermally fusible fiber $a_2$ so that the conductive fibers $a_1$ are firmly sticked to the surface of the substrate B. A practical method of pressure-sticking is such that the cloth-like material A is overlaid on the substrate B or sticked on the substrate B with adhesive and then both members are pressed by means of a heating body such as a heating roll or a heating plate. When the substrate B is made of resin, methods as described under in the paragraphs (i) through (iv), particularly (i) through (iii), are preferable by reasons that: heat used for molding can also be applied to melting of fusible fibers $a_2$ as it is, which leads to advantage in thermal efficiency; conductive fibers $a_1$ are strongly sticked to the surface of the substrate B; and a smooth and fine surface of the product can be obtained.

(i) To apply extrusion coating to the cloth-like material A with molten resin for forming a substrate B;

(ii) To insert the cloth-like material A into the mold and then inject molten resin for forming a substrate B into said mold according to the injection molding method;

(iii) To insert the cloth-like material A into the mold and then press and stick the heated and softened substrate B to the cloth-like material A according to the vacuum molding or deep drawing molding method; and, (iv) To insert the cloth-like material A into the mold and then expand the parison until filling the mold for forming a substrate B according to the blow molding method.

Figure 2:
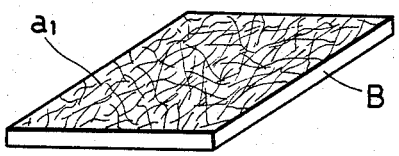

FIG. 1 is a perspective view showing the state of the cloth-like material A and the substrate B before subjected to pressure-sticking process, both members composing a structure of two layers. FIG. 2 is a perspective view showing the state of the same members after pressed and sticked to each other, wherein thermally fusible fibers $a_2$ in the cloth-like material A has molten and disappeared from sight whereas conductive fibers $a_1$ only maintain initial appearance thereof while sticking to the substrate B.

The conductive fibers $a_1$ may be sticked to one side or both sides of the substrate B.

A structure thus obtained, if produced in the form of sheet or board, can be provided to the secondary process such as vacuum molding, deep drawing molding, or roll forming.

This invention permits to compose a multi-layer structure depending on an addition of other substrate during or after the manufacture of conductive structure.

A structure according to this invention, in which conductive fibers $a_1$ stick to the substrate B by melting of the thermally fusible fibers $a_2$ entangling with the conductive fibers $a_1$, composes an irregular net pattern (when non-woven fabric is used as the cloth-like material A) or regular pattern (when woven fabric or knitted fabric is used as the cloth-like material A), thereby exhibiting excellent effects as follows:

(1) One side of the substrate B to which conductive fibers $a_1$ are sticked is conductive and, of course, anti-static. When the substrate B is relatively thin, the side to which none of conductive fibers $a_1$ are sticked is also anti-static and prevents adhesion of dusts. Decrease in conductive, anti-static, and dust-proof properties with the lapse of time and under low humidity never occurs.

(2) There is no possibility of occurrence of pin holes even when a structure is as thin as sheet or film.

(3) Mechanical properties intrinsic to the substrate B are not impaired.

(4) Transparency or color of the substrate B is scarcely changed.

(5) Conductivity or anti-static property of the structure is not weakened even when subjected to the secondary process such as vacuum molding or roll forming.

(6) Manufacture of a conductive structure whose surface is spherical or rugged or provided with grooves or holes is easy.

A conductive structure according to the present invention is useful as a sheet, film, tray, magazine rack, bag, and container for packaging, storing, or transporting the semiconductor devices for IC, LSI, etc.; part, cabinet, and housing of electronic or electrical, acoustic, and precision instruments; materials in the computer room, clean room, or sterile room; gasoline container; and other various things.

The present invention is more particularly described and explained by means of the following Examples, in which percentages (%) are all by weight unless otherwise indicated.

EXAMPLE 1

A non-woven fabric A weighing 20 g/m² made of a mixture containing 10% of acrylic copper-adsorption fibers $a_1$ (Thunderlon SS-N, made by Nihon Sanmo Dyeing Co., Ltd.), 3 D (deniers) and 5 cm in length, and 90% of polypropylene fibers $a_2$, 3 D, 5 cm, (melting point: 150° C.) was sticked to a polypropylene sheet B of 0.2 mm thickness (melting point: 160° C.) which adhesive. When this laminated sheet was passed between heating rolls of 160° C., polypropylene fibers $a_2$ melted and the polypropylene sheet B also melted or softened so that both members were unified into one layer and acrylic copper-adsorption fibers $a_1$ only were firmly sticked to the surface of this unified layer in an irregular net pattern.

A sheet thus obtained was fine and transparency of the substrate B, namely, the polypropylene sheet B was almost kept unchanged. Even when the fiber($a_1$)-sticking surface of this sheet was forcefully rubbed with a cloth and was scratched with finger nail, the fiber $a_1$ did not peel off at all.

Friction charge voltage on the surface of the sheet measured by the rotary static voltmeter was not higher than 0.1 kV under conditions of 20° C. and 40% RH, and voltage on the reverse side was as low as 1.5 kV. Specific resistance on the surface of this sheet was within a range of $10^{-2}$–$10^0$ Ωcm. Incidentally, friction charge voltage and specific resistance of the polypropylene sheet B only were 4.6 kV and within $10^{14}$–$10^{15}$ Ωcm, respectively.

At the final stage, this sheet was presented for vacuum molding so as to be formed into a tray, when conductivity was hardly reduced.

EXAMPLE 2

A piece of fabric A, muslin, Swatch No. 4, (30×30/60×52), was woven of spun yarn composed of 3% of acrylic copper-adsorption cut fibers $a_1$ and 97% of polypropylene fibers $a_2$ (melting point: 150° C.), and sticked to a polypropylene sheet B of 0.2 mm thickness (melting point: 160° C.) by means of adhesive. When this laminated sheet was passed between hot rollers of 160° C., polypropylene fibers $a_2$ melted as well as the polypropylene sheet B melted or softened so that fibers and the sheet are unified into one layer on which acrylic copper-adsorption fibers $a_1$ only were sticked to the surface in a regular net pattern.

Transparency of the polypropylene sheet B as a substrate of the sheet thus obtained was maintained almost unchanged. Even when the surface of this sheet (surface to which fibers $a_1$ were sticked) was forcefully rubbed with a cloth or scratched by finger nail, the fibers $a_1$ did not peel off at all.

Friction charge voltage on the surface of this sheet measured by the rotary static voltmeter was not higher than 0.1 kV at 20° C., 40% RH, and that on the reverse side was also as low as 1.3 kV.

EXAMPLE 3

A thin fabric was knitted of the spun yarn made of a mixture of 5% of nickel plated cut fibers $a_1$, 65% of nylon cut fibers $a_2$ (melting point: 110° C.), and 30% of acrylic cut fibers $a_3$ (having a high melting point). This fabric A was overlaid on either side of the nylon film B of 0.08 mm thickness (melting point: 155° C.) and heat-pressed at 160° C. The nylon fibers $a_2$ melted and were unified into one layer with the nylon film B. Both surfaces of this layer were covered with nickel plated fibers $a_1$ and acrylic fibers $a_3$ sticked in a net pattern.

Friction charge voltage on the surface of this film was almost zero, specific resistance being $10^{-5}$ Ωcm.

EXAMPLE 4

A non-woven fabric A as used in Example 1 was overlaid on the reverse side of acrylic carpet whose pile part weighs 800 g/m² and pressed so as to be sticked to each other by the hot roller of 180° C.

A carpet thus processed was charged only to 2,300 V, which is short of 3,000 V as a threshold of feeling electric shock, even when forcefully rubbed at the right side.

Another carpet to which none of non-woven fabric A was heat-pressed at the reverse side was charged higher than 7,000 V when forcefully rubbed at the right side.

EXAMPLE 5

A non-woven fabric weighing 20 g/m² made of a mixture of 10% of acrylic copper-adsorption fibers $a_1$, 3 D, 5 cm, and 90% of polyester fibers $a_2$, 3 D, 5 cm, having the melting point of 110° C. was inserted into the metallic mold of the injection molding machine so as to be subjected to injection molding with ABS resin under the following conditions:
Cylinder temperature:
 Rear part—210° C.
 Central part—230° C.
 Front part—245° C.
 Nozzle part—230° C.
Mold temperature: 60° C.
Injection pressure: 1,400 kg/cm²
Injection period: 20 sec.

According to this molding, obtained was a cabinet in size of 300 mm×200 mm and having side walls in thickness of 3 mm provided with several projections and grooves. The inner surface of the cabinet was covered with acrylic copper-adsorption fibers $a_1$ firmly sticked thereto in an irregular net pattern, whereas polyester fibers melted and disappeared from sight, when color of ABS resin that molded into cabinet was not so much faded in spite of firm sticking of the fiber $a_1$.

The fibers $a_1$ did not peel off even when the inner walls of the cabinet were strongly rubbed with a cloth. Friction charge voltage on the inner walls of the cabinet measured by the rotary static voltmeter was not higher than 0.1 kV at 20° C., 40% RH, specific resistance being within $10^{-2}$–$10^\circ$ Ωcm.

EXAMPLE 6

A non-woven fabric weighing 25 g/m² made of a mixture of 6% of copper-adsorption cyano-group-introduced nylon fibers $a_1$, 3 D, 5 cm, and 94% of nylon fibers $a_2$, 3 D, 5 cm, having the melting point of 110° C. was inserted into the metallic mold of the injection molding machine so as to be subjected to molding with nylon 6 under the following conditions:
Cylinder temperature: 235° C.
Mold temperature: 60°–70° C.
Injection pressure: 1,100 kg/cm²
Injection period: 20 sec.

According to this molding, obtained was a reel for winding of video tape, 90 mm in diameter, 18 mm wide, and 1.5 mm in thickness of side plate. To both sides of the reel, copper-adsorption cyano-group-introduced nylon fibers $a_1$ were firmly sticked in an irregular net pattern whereas another nylon fibers $a_2$ disappeared from sight.

When the reel was used for winding the tape at high speed or for another purpose after put into a cassette while carrying the tape, no trouble relating to electrostatic phenomenon ascribable to friction between the tape and the reel or at the contact point of the reel with the cabinet did occur at all.

Friction charge voltage on the surface of the reel to which the fibers $a_1$ were sticked was not higher than 0.1 kV, specific resistance being within $10^{-2}$–$10^\circ$ Ωcm.

EXAMPLE 7

A non-woven fabric weighing 20 g/m² made of a mixture of 4% of aluminum-metalized fibers $a_1$ and 96% of polyester fibers $a_2$ having the melting point of 110° C. was placed in the metallic mold of the vacuum molding machine so as to be subjected to vacuum molding with a foam polystyrene sheet. The temperature for molding was 140° C. To the bottom surface of a tray thus obtained, acrylic copper-adsorption fibers $a_1$ were firmly sticked in an irregular net pattern.

EXAMPLE 8

A non-woven fabric weighing 20 g/m² made of a mixture of 4% of carbon fibers $a_1$ and 96% of polyester fibers $a_2$ having the melting point of 110° C. was placed in the metallic mold of the vacuum molding machine so as to be subjected to vacuum molding with a foam polystyrene sheet at the temperature of 140° C. To the bottom surface of a tray thus obtained, carbon fibers $a_1$ were firmly sticked in an irregular net pattern.

EXAMPLE 9

A non-woven fabric weighing 20 g/m² made of a mixture of 4% of aluminum fibers $a_1$ and 96% of polyester fibers $a_2$ having the melting point of 110° C. was placed in the metallic mold of the vacuum molding machine so as to be subjected to vacuum molding with a foam polystyrene sheet at the temperature of 140° C. To the bottom surface of a tray thus obtained, aluminum fibers $a_1$ were firmly sticked in an irregular net pattern.

EXAMPLE 10

A non-woven fabric A as used in Example 1 was coated with molten polyethylene extruded from the extruder equipped with T-die at 220° C. and then subjected pressure-sticking while being passed between rollers.

To the surface of a sheet thus obtained and having the thickness of 0.04 mm, acrylic copper-adsorption fibers $a_1$ were firmly sticked in an irregular net pattern. Friction charge voltage on the surface of this sheet to which fibers $a_1$ were sticked was not higher than 0.1 kV, specific resistance being within $10^{-2}$–$10^0$ Ωcm.

What is claimed is:

1. A method of manufacturing a conductive structure which comprises:
    subjecting a non-woven fabric containing 0.01 to 99% by weight of copper-adsorption fibers having a cyano radical and reduced after being subjected to adsorption of copper ion thereto and 99.99 to 1% by weight of thermally fusible fibers and a thermoplastic resin molded non-fibrous material in the form of sheet, film or board to fusion bonding under pressure at a temperature exceeding a melting point of said thermally fusible fibers so that said thermally fusible fibers are melting to form a layer translucent enough to allow the non-fibrous material to be perceived therethrough, said copper-adsorption fibers maintaining initial appearance thereof and being fused to the surface of said thermoplastic resin molded non-fibrous material.

2. A method of manufacturing a conductive structure as set forth in claim 1, wherein there is provided a structure in which copper-adsorption fibers are fused to the surface of the thermoplastic resin molded non-fibrous material thereof by overlaying the non-woven fabric on the thermoplastic resin molded non-fibrous material or fusing both members together and then pressing them by means of a heating body for heat-fusing.

3. A method of manufacturing a conductive structure as set forth in claim 1, wherein there is provided a structure in which copper-adsorption fibers are fused to the surface of the thermoplastic resin molded non-fibrous material there of by applying extrusion coating to the non-woven fabric with molten resin for forming the thermoplastic resin molded non-fibrous material.

4. A method of manufacturing a conductive structure as set forth in claim 1, wherein there is provided a structure in which copper-adsorption fibers are fused to the surface of the thermoplastic resin molded non-fibrous material thereof by inserting the non-woven fabric into a mold and then injecting molten resin into the mold for forming the thermoplastic resin molded non-fibrous material according to an injection molding method.

5. A method of manufacturing a conductive structure as set forth in claim 1, wherein there is provided a structure in which copper-adsorption fibers are fused to the surface of the thermoplastic resin molded non-fibrous material thereof by inserting the non-woven fabric into a mold and then pressing and fusing a heated and softened thermoplastic resin molded non-fibrous material to the non-woven fabric according to a vacuum molding or deep drawing molding method.

* * * * *